US012223881B2

(12) United States Patent
Kim et al.

(10) Patent No.: US 12,223,881 B2
(45) Date of Patent: Feb. 11, 2025

(54) GATE DRIVER AND DISPLAY DEVICE INCLUDING THE SAME

(71) Applicant: LG Display Co., Ltd., Seoul (KR)

(72) Inventors: Ju Hong Kim, Paju-si (KR); Yong Chan Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/497,875

(22) Filed: Oct. 30, 2023

(65) Prior Publication Data

US 2024/0257711 A1 Aug. 1, 2024

(30) Foreign Application Priority Data

Jan. 31, 2023 (KR) ........................ 10-2023-0012430

(51) Int. Cl.
*G09G 3/30* (2006.01)

(52) U.S. Cl.
CPC ....... *G09G 3/30* (2013.01); *G09G 2310/0267* (2013.01); *G09G 2310/08* (2013.01)

(58) Field of Classification Search
CPC ............. G09G 3/30; G09G 2310/0267; G09G 2310/08; G09G 3/3677; G09G 3/3266; G09G 2300/0413; G09G 2300/0421; G09G 2320/0223; G02F 1/136286; H10K 59/131
See application file for complete search history.

(56) References Cited

U.S. PATENT DOCUMENTS

| | | | | |
|---|---|---|---|---|
| 11,244,644 | B2 | 2/2022 | Noh et al. | |
| 2007/0001987 | A1* | 1/2007 | Chun | G09G 3/3677 345/100 |
| 2015/0162058 | A1* | 6/2015 | Joshi | G11C 15/04 365/189.11 |
| 2018/0005585 | A1* | 1/2018 | Kim | H10K 59/131 |

FOREIGN PATENT DOCUMENTS

| | | | |
|---|---|---|---|
| KR | 102056278 | B1 | 12/2019 |
| KR | 20200041605 | A | 4/2020 |
| KR | 102115462 | B1 | 5/2020 |
| KR | 102360787 | B1 | 2/2022 |

* cited by examiner

*Primary Examiner* — Grant Sitta
(74) *Attorney, Agent, or Firm* — Seed IP Law Group LLP

(57) ABSTRACT

A gate driver according to an embodiment and a display device including the same are disclosed. The gate driver according to the embodiment includes an output clock line through which an output clock signal is applied, a dummy clock line disposed side by side with the output clock line and through which a dummy clock signal is applied, a pull-up transistor including a first electrode connected to the output clock line, a gate electrode connected to a first control node, and a second electrode connected to an output node from which a gate signal is output, and a pull-down transistor including a first electrode connected to the output node, a gate electrode connected to a second control node, and a second electrode connected to a power line through which a low-potential power voltage is applied.

18 Claims, 10 Drawing Sheets

GATE DRIVER AND DISPLAY DEVICE INCLUDING THE SAME

CROSS-REFERENCE TO RELATED APPLICATION

This application claims priority to and the benefit of Korean Patent Application No. 10-2023-0012430, filed on Jan. 31, 2023, the disclosure of which is incorporated herein by reference in its entirety.

BACKGROUND

Technical Field

The present disclosure relates to a gate driver and a display device including the same.

Description of the Related Art

Display devices include a liquid crystal display (LCD) device, an electroluminescence display device, a field emission display (FED) device, a plasma display panel (PDP), and the like.

Electroluminescent display devices include inorganic light emitting display devices and organic light emitting display devices according to a material of a light emitting layer. An active-matrix type organic light emitting display device reproduces an input image using a self-emissive element which emits light by itself, for example, an organic light emitting diode (hereinafter referred to as an "OLED"). An organic light emitting display device has advantages in that a response speed is fast and luminous efficiency, luminance, and a viewing angle are large.

Some of display devices, for example, a liquid crystal display device or an organic light emitting display device include a display panel including a plurality of sub-pixels, a driver outputting a driving signal for driving the display panel, a power supply generating power to be supplied to the display panel or the driver, and the like. The driver includes a gate driver that supplies a scan signal or a gate signal to the display panel, and a data driver that supplies a data signal to the display panel.

In such a display device, when a driving signal such as a scan signal, an emission (EM) signal, and a data signal is supplied to a plurality of sub-pixels formed in the display panel, the selected sub-pixel transmits light or emits light directly to thereby display an image.

A gate driver outputs a gate signal using a pull-up transistor connected to a Q node and a pull-down transistor connected to a QB node. The pull-up transistor outputs a high voltage of a clock signal through an output node when the Q node has a high voltage, and the pull-down transistor outputs a low voltage of the clock signal through the output node when the QB node has a high voltage.

At this time, due to a resistance-capacitance (RC) load of a clock signal line through which the clock signal is applied, the clock signal is delayed, which degrades output characteristics. That is, the delay of the clock signal is reflected to the output characteristics and causes a delay in a rising time and a falling time of the gate signal. Accordingly, when implementing high-speed operation of a display device, a duration of a pulse width is reduced due to an increase in frequency, and thus improvement of the rising time and the falling time of the gate signal is beneficial.

BRIEF SUMMARY

The present disclosure includes technical features that are beneficial in improving on one or more of the deficiencies described previously.

The present disclosure provides a gate driver with improved output characteristics and a display device including the same.

It should be noted that benefits of the present disclosure are not limited to the above-described benefits, and other benefits of the present disclosure will be apparent to those skilled in the art from the following descriptions.

A gate driver according to an embodiment of the present disclosure includes an output clock line through which an output clock signal is applied, a dummy clock line disposed side by side with the output clock line and through which a dummy clock signal is applied, a pull-up transistor including a first electrode connected to the output clock line, a gate electrode connected to a first control node, and a second electrode connected to an output node from which a gate signal is output, and a pull-down transistor including a first electrode connected to the output node, a gate electrode connected to a second control node, and a second electrode connected to a power line through which a low-potential power voltage is applied.

A display device according the an embodiment of the present disclosure includes a data driver configured to output a data voltage, a gate driver including a circuit unit configured to output a gate signal to a output node by transmitting an output clock signal and a low-potential power voltage to the output node according to voltages of a first control node and a second control node, and a plurality of pixel circuits configured to reproduce an input image by receiving the data voltage and the gate signal, wherein the gate driver includes an output clock line through which the output clock signal is applied, a dummy clock line disposed side by side with the output clock line and through which a dummy clock signal is applied, a pull-up transistor including a first electrode connected to the output clock line, a gate electrode connected to the first control node, and a second electrode connected to the output node from which the gate signal is output, and a pull-down transistor including a first electrode connected to the output node, a gate electrode connected to the second control node, and a second electrode connected to a power line through which the low-potential power voltage is applied.

In an aspect, the output clock line and the dummy clock line may be disposed on different layers.

In another aspect, the output clock line and the dummy clock line may be disposed to overlap each other.

In a further aspect, the output clock line may be disposed on a first layer, and the dummy clock line may be disposed on a second layer located below the first layer.

In another aspect, the pull-up transistor and the pull-down transistor may be disposed on a third layer located below the second layer.

In a further aspect, the output clock signal and the dummy clock signal may be input in synchronization with each other.

In another aspect, the output clock signal and the dummy clock signal may be the same signal.

In a further aspect, the gate driver may include a plurality of gate drivers configured to output different gate signals, wherein each of the plurality of gate drivers may include a layer on which the output clock line is formed and a layer on which the dummy clock line is formed.

In another aspect, the gate driver may include a plurality of gate drivers configured to output different gate signals, wherein each of the plurality of gate drivers may include a layer on which the output clock line is formed and a layer on which the dummy clock line is formed, wherein the layer on which the dummy clock line is formed is integrated into a single layer.

According to the present disclosure, a dummy clock line through which a dummy clock signal, which is the same as an output clock signal for generating a gate signal, is applied is disposed for each output clock line through which the output clock signal is applied to reduce an RC load of the output clock line, so that a delay of the output clock signal can be minimized or reduced, and since the delay of the output clock signal is minimized or reduced, a rising time and a falling time of the output clock signal can be reduced, thereby improving output characteristics.

According to the present disclosure, by improving the output characteristics by reducing the rising time and the falling time of the output clock signal, a pulse width margin for writing data during high-speed operation of a display device can be secured.

According to the present disclosure, by improving the output characteristics, a channel width of a buffer transistor configured to output the gate signal can be reduced, which can be advantageous for implementing a narrow bezel.

The effects of the present disclosure are not limited to the above-mentioned effects, and other effects that are not mentioned will be apparently understood by those skilled in the art from the following description and the appended claims.

BRIEF DESCRIPTION OF THE SEVERAL VIEWS OF THE DRAWINGS

The above and other benefits, features, and advantages of the present disclosure will become more apparent to those of ordinary skill in the art by describing example embodiments thereof in detail with reference to the accompanying drawings, in which.

DETAILED DESCRIPTION

Figure 1:
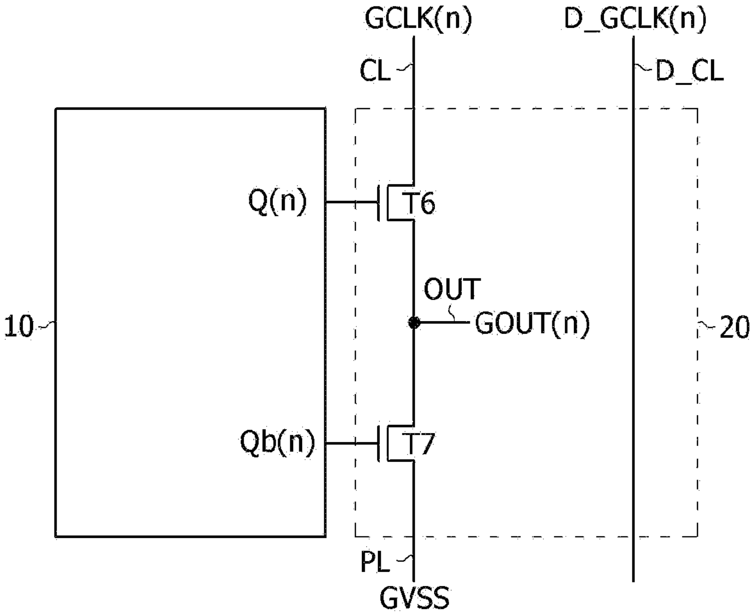
FIG. 1 is a diagram illustrating a gate driver according to a first embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

FIG. 1 is a diagram illustrating a gate driver according to a first embodiment of the present disclosure, and FIGS. 2 to 9 are diagrams for describing the arrangement and operation principle of two clock lines shown in FIG. 1.

Referring to FIG. 1, a gate driver according to a first embodiment of the present disclosure may include a first control node (hereinafter, referred to as a "Q node") for pulling up an output voltage, a second control node (hereinafter, referred to as a "Qb node") for pulling down the output voltage, a first circuit unit or "first circuit" 10, and a second circuit unit or "second circuit" 20. Throughout the description, the terms "unit" and "circuit unit" include within their meaning that a circuit, including electrical wire conductors and transistors, is present in the structure.

In this case, the first circuit unit 10 may control charging and discharging of a Q node Q(n) and a Qb node Qb(n). For example, the first circuit unit 10 may be implemented to include, as in a 1-1 circuit unit 10-1 in FIG. 13, a first control circuit 11 that serves to control the charging and discharging of the Q node Q(n) and the Qb node Qb(n) and a second control circuit 12 that inverts a voltage of the Q node Q(n) and applies the inverted voltage to the Qb node Qb(n), but the present disclosure is not necessarily limited thereto.

The second circuit unit 20 outputs gate signals GOUT(n) in response to potentials of the Q node Q(n) and the Qb node Qb(n).

The second circuit unit 20 includes an output clock line CL through which an output clock signal GCLK(n) is applied, a dummy clock line D_CL through which a dummy clock signal D_GCLK(n) is applied, and buffer transistors T6 and T7 that output the gate signals GOUT(n). The buffer transistors T6 and T7 are divided into a pull-up transistor T6 configured to be turned on based on the potential of the Q node Q(n) and a pull-down transistor T7 configured to be turned on based on the potential of the Qb node Qb(n). The pull-up transistor T6 includes a gate electrode connected to the Q node Q(n), a first electrode connected to the output clock line CL through which the output clock signal GCLK (n) is applied, and a second electrode connected to an output node OUT. The pull-down transistor T7 includes a gate electrode connected to the Qb node Qb(n), a first electrode connected to the output node OUT, and a second electrode connected to a power line PL through which a low-potential power voltage GVSS is applied. The buffer transistors T6 and T7 output the gate signals GOUT(n) based on the output clock signal GCLK(n) applied through the output clock line CL and the low-potential power voltage GVSS applied through the power line PL.

In this case, the gate signals may include signals applied to drive switch elements of a pixel circuit, such as a scan signal, a sensing signal, a light-emitting (EM) control signal, and an initialization signal.

Figure 2:
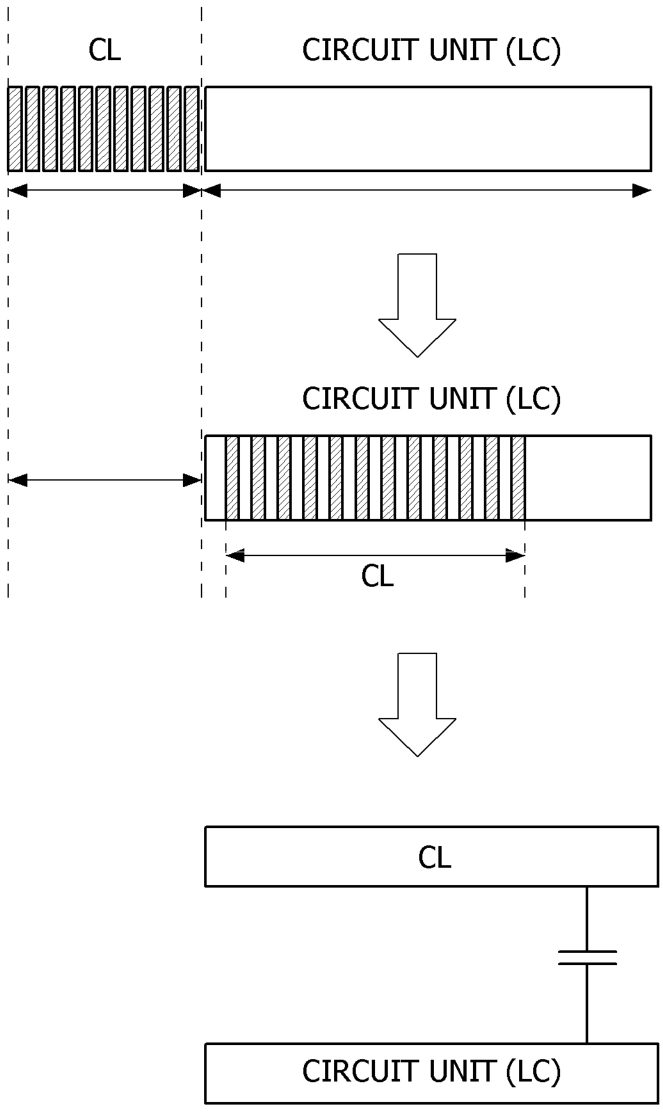
FIGS. 2 to 9 are diagrams for describing the arrangement and operation principle of two clock lines shown in FIG. 1.

As shown in FIG. 2, in the first embodiment, in order to reduce a bezel, a circuit unit LC including transistors and circuit wirings and the output clock line CL may be formed on different layers while overlapping each other. By forming the output clock line CL to overlap the circuit unit LC on an upper portion of the circuit unit LC instead of forming the output clock line CL side by side with the circuit unit LC, namely, closely adjacent to the circuit LC, an area occupied by the output clock line CL can be reduced, and the bezel can be reduced by the size of the area.

At this time, a capacitance may be generated between the circuit unit LC and the output clock line CL.

Figure 3:
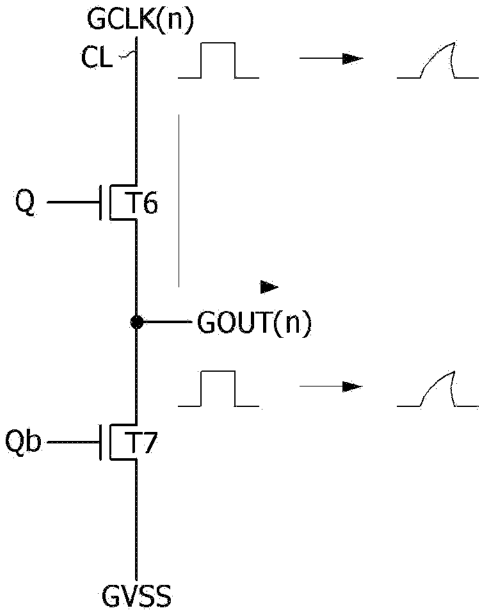

As shown in FIG. 3, the capacitance generated between the circuit unit LC and the output clock line CL increases a resistance-capacitance (RC) load of the output clock line CL, and thus, a delay is generated in the output clock signal GCLK(n) due to the RC load, and this delay in the output clock signal GCLK(n) is directly reflected to the gate signal, so that a rising time and a falling time of the gate signal are also increased.

Figure 4:
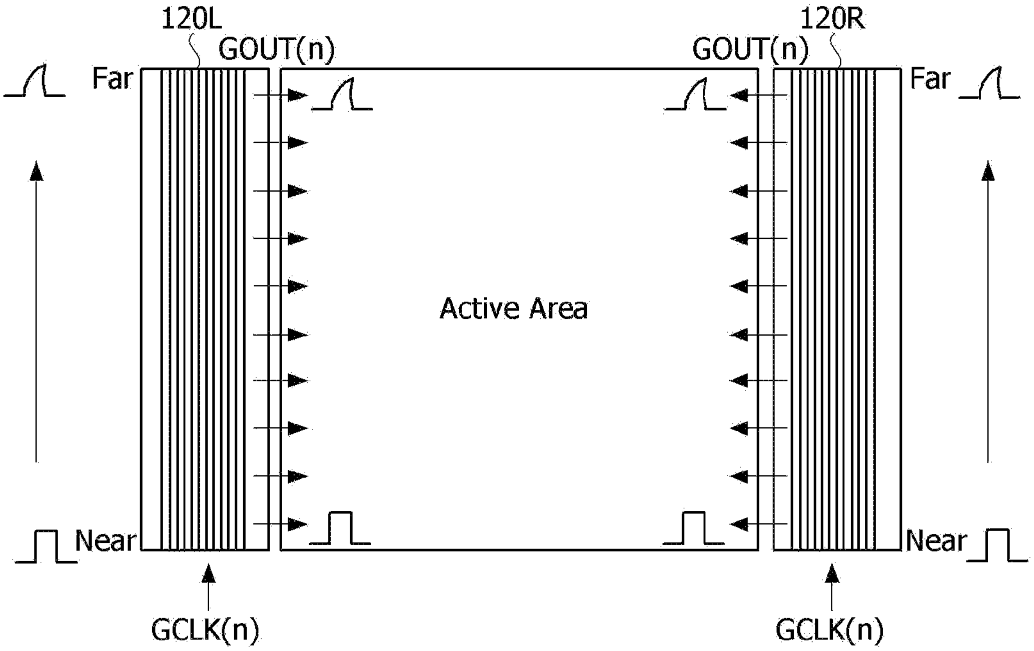

In addition, as shown in FIG. 4, a delay deviation caused by the RC load is greatly generated at an input end and a termination end of the output clock line through which the output clock signal GCLK(n) is applied, so that an output characteristic deviation, i.e., a characteristic deviation of the rising time and the falling time of the gate signal GOUT(n), is generated for each position, and this output characteristic deviation for each position causes a charging characteristic deviation of the display device.

Due to the higher resolution and larger area of the display device, the RC load on the output clock line is further increased, and a driving frequency is also increased for high-speed operation of the display device, and thus an effective pulse width margin for data input is reduced, which causes difficulties in securing output performance.

Figure 5:
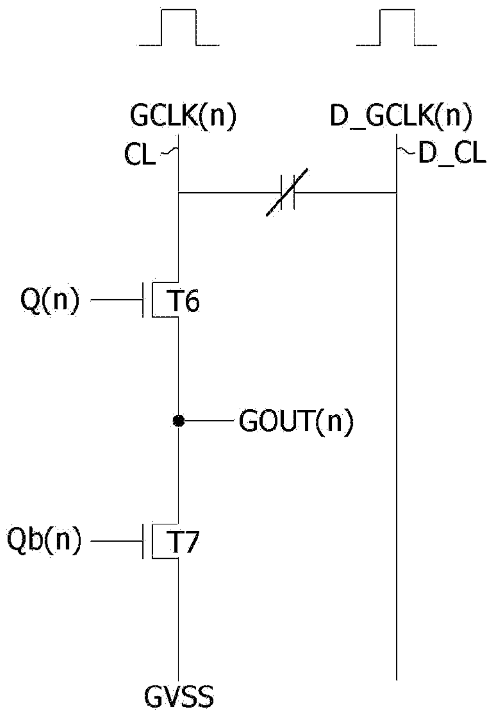

Accordingly, in the first embodiment, a structure for reducing the RC load of the output clock line is proposed. That is, as shown in FIG. 5, the output clock line CL and the dummy clock line D_CL are disposed side by side and the output clock signals GCLK(n) and D_GCLK(n) are equally applied to the output clock line CL and the dummy clock line D_CL.

By disposing two clock lines CL and D_CL side by side, a capacitance may be generated between the two clock lines CL and D_CL, but the capacitance may be canceled by applying the same clock signal, and when the capacitance between the two clock lines CL and D_CL is canceled, the RC load may be reduced.

Figure 6A:
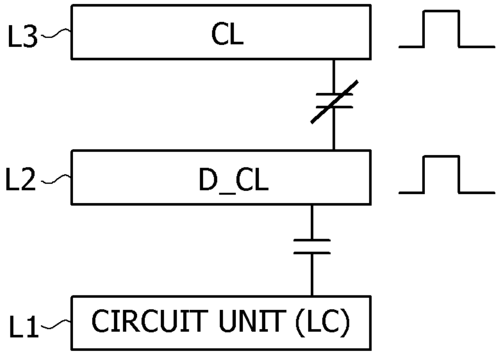
Figure 6B:
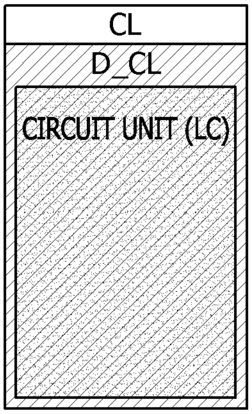

As shown in FIGS. 6A and 6B, when the output clock line CL and the dummy clock line D_CL are formed on different layers, the dummy clock line D_CL should be formed between the output clock line CL and the circuit unit LC. For example, the circuit unit LC is formed on a first layer L1, the dummy clock line D_CL is formed on a second layer L2 disposed above the first layer L1, and the output clock line CL is formed on a third layer L3 disposed above the second layer L2. Here, the first layer, the second layer, and the third layer are shown in arbitrary sizes for convenience of description and are not necessarily limited thereto.

This means that a capacitance may be generated between the output clock line CL and the dummy clock line D_CL, and a capacitance may be generated between the dummy clock line D_CL and the circuit unit LC, but the capacitance between the output clock line CL and the dummy clock line D_CL is canceled by applying the same signal to the output clock line CL and the dummy clock line D_CL, and, even though the capacitance exists between the dummy clock line D_CL and the circuit unit LC, the effect of the capacitance on the output clock line CL is reduced, so the RC load of the output clock line CL may be reduced.

On the other hand, when the output clock line CL is formed between the dummy clock line D_CL and the circuit unit LC, two capacitances that may affect the output clock line CL are generated, and only one of the two capacitances is removed. That is, a capacitance is generated between the output clock line CL and the dummy clock line D_CL, and a capacitance is generated between the output clock line CL and the circuit unit LC, and the capacitance between the output clock line CL and the dummy clock line D_CL is canceled by applying the same signal, but there is still the capacitance between the output clock line CL and the circuit unit LC, which increases the RC load on the output clock line CL.

Accordingly, the dummy clock line D_CL is formed between the output clock line CL and the circuit unit LC.

Figure 7:
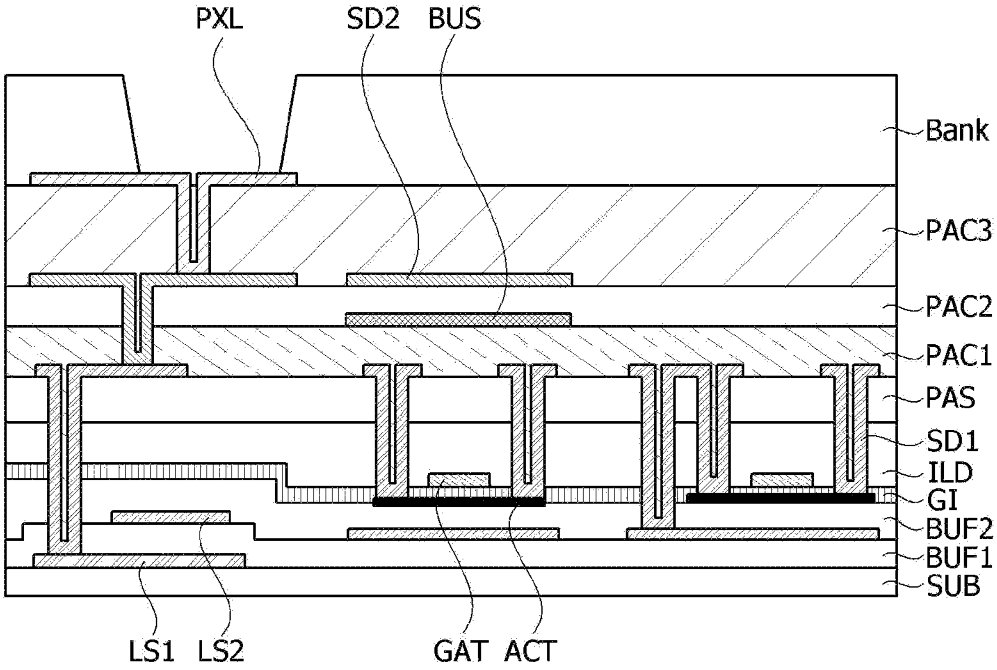

Referring to FIG. 7, a first light shield layer LS1 is formed on a substrate SUB, a first buffer layer BUF1 is formed on the first light shield layer LS1, a second light shield layer LS2 is formed on the first buffer layer BUF1, and a second buffer layer BUF2 is formed on the second light shield layer LS2.

An active layer ACT is formed on the second buffer layer BUF2, and a gate insulating film GI is formed on the active layer ACT.

A gate electrode GAT is formed on the gate insulating film GI, and an intermediate insulating film ILD is formed on the gate electrode GAT.

A passivation layer PAS is formed on the intermediate insulating film ILD, and a first metal layer SD1 is formed on the passivation layer PAS. The first metal layer SD1 is in contact with the active layer ACT.

A first planarization film PAC1 is formed on the first metal layer SD1, a bus layer BUS corresponding to the dummy clock line is formed on the first planarization film PAC1, a second planarization film PAC2 is formed on the bus layer BUS, and a second metal layer SD2 corresponding to the output clock line is formed on the second planarization film PAC2. The second metal layer SD2 and the bus layer BUS may be formed side by side.

A third planarization film PAC3 is formed on the second metal layer SD2, and a pixel electrode PXL is formed on the third planarization film PAC3. At this time, the pixel electrode PXL is in contact with the second metal layer SD2.

Figure 8:
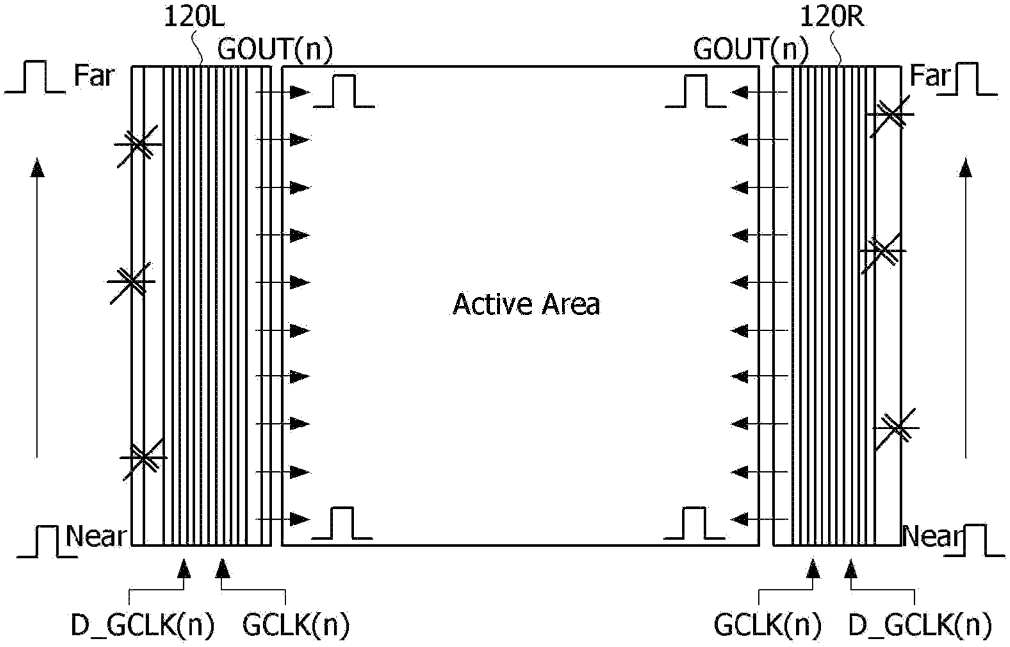

As shown in FIG. 8, a constant output signal, i.e., the gate signal, may be output since a delay deviation caused by the RC load is not generated at the input end and the termination end of the output clock line through which the output clock signal is applied.

Figure 9:
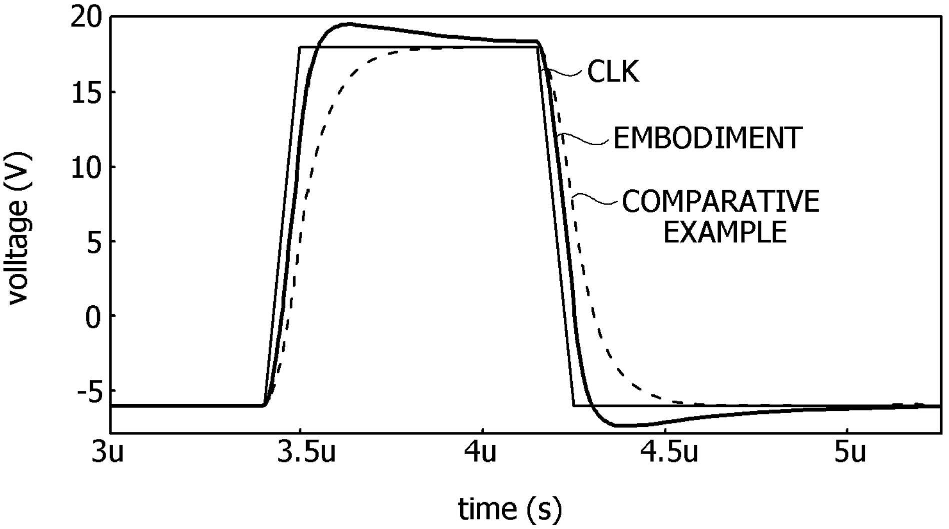

FIG. 9 shows a result of simulating output characteristics of the output signal with respect to the output clock signal GCLK input according to the embodiment and a comparative example. It can be seen that the output signal according to the structure of the comparative example has poor output characteristics due to an increase in the rising time and the falling time due to the RC load of the output clock line, while the output signal according to the structure of the embodiment has improved output characteristics due to a reduction in the rising time and the falling time due to the effect of reducing the RC load.

Figure 10A:
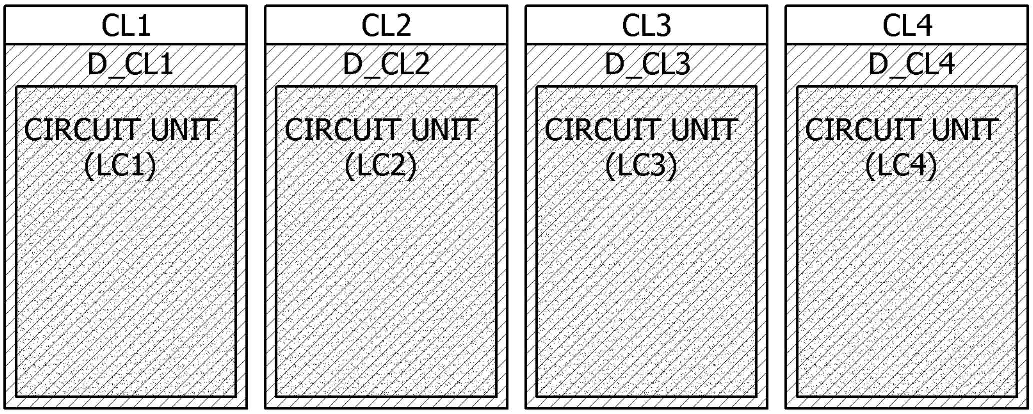
FIGS. 10A and 10B are diagrams for describing an example in which a plurality of clock lines are configured.
Figure 10B:
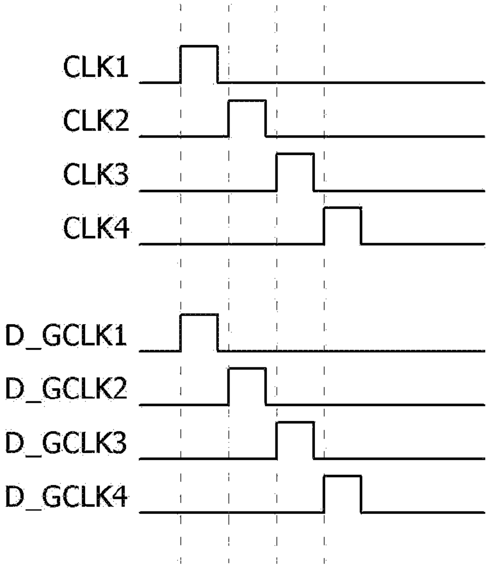

FIGS. 10A and 10B are diagrams for describing an example in which a plurality of clock lines are configured.

Referring to FIGS. 10A and 10B, when a plurality of gate drivers are configured, output clock lines CL1, CL2, CL3, and CL4, through which different output clock signals GCLK1, GCLK2, GCLK3, and GCLK4 are applied to circuit units, may be formed in the gate drivers, respectively, and dummy clock lines D_CL1, D_CL2, D_CL3, and D_CL4, through which dummy clock signals D_CLK1, D_CLK2, D_CLK3, and D_CLK4 are applied, may be respectively formed on the output clock lines CL1, CL2, CL3, and CL4, through which the output clock signals GCLK1, GCLK2, GCLK3, and GCLK4 are applied.

Here, for the respective gate drivers, layers on which the output clock lines, through which the output clock signals are respectively applied, are disposed and layers on which the dummy clock lines, through which the dummy clock signals are respectively applied, are formed may be formed by being physically separated from each other.

Accordingly, for the respective gate drivers, the output clock signals GCLK1, GCLK2, GCLK3, and GCLK4 and the dummy clock signals D_CLK1, D_CLK2, D_CLK3, and D_CLK4 may be synchronized with each other and applied to the corresponding output clock lines CL1, CL2, CL3, and CL4 and dummy clock lines D_CL1, D_CL2, D_CL3, and D_CL4, respectively.

Figure 11A:
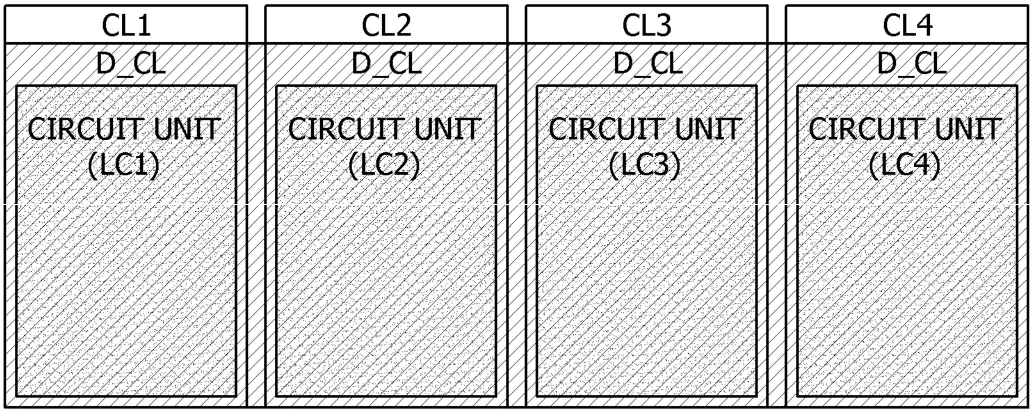
FIGS. 11A and 11B are diagrams for describing another example in which a plurality of clock lines are configured.
Figure 11B:
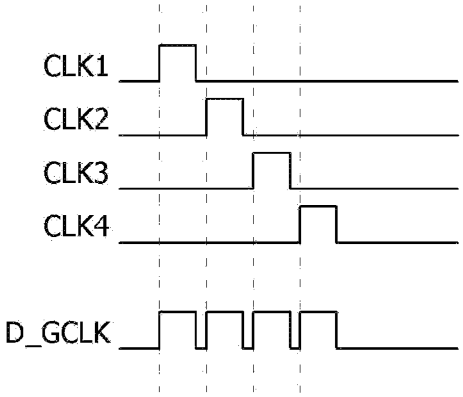

FIGS. 11A and 11B are diagrams for describing another example in which a plurality of clock lines are configured.

Referring to FIGS. 11A and 11B, when a plurality of gate drivers are configured, output clock lines CL1, CL2, CL3, and CL4, through which different output clock signals GCLK1, GCLK2, GCLK3, and GCLK4 are applied to circuit units, may be formed in the gate drivers, respectively, and a single dummy clock line D_CL, through which a single dummy clock signal D_CLK is applied, may be formed to be connected to each of the output clock lines CL1, CL2, CL3, and CL4, through which the output clock signals GCLK1, GCLK2, GCLK3, and GCLK4 are respectively applied.

Here, for the respective gate drivers, layers on which the clock lines through which the clock signals are respectively applied are disposed may be formed by being physically separated from each other, but layers on which the dummy clock lines through which the dummy clock signals are applied are formed may be formed by being physically integrated with each other across all the gate drivers.

Accordingly, for the respective gate drivers, whenever the output clock signals GCLK1, GCLK2, GCLK3, and GCLK4 are respectively applied through the corresponding output clock lines CL1, CL2, CL3, and CL4, the dummy clock signal D_CLK may be synchronized with each of the output clock signals GCLK1, GCLK2, GCLK3, and GCLK4 and commonly applied to the single dummy clock line D_CL across all the gate drivers.

By forming the layers on which the dummy clock lines are formed as a single physically integrated layer, and connecting the dummy clock lines of the respective gate drivers to configure a single dummy clock line, there is an advantage that only one circuit needs to be configured to generate the dummy clock signal.

Figure 12:
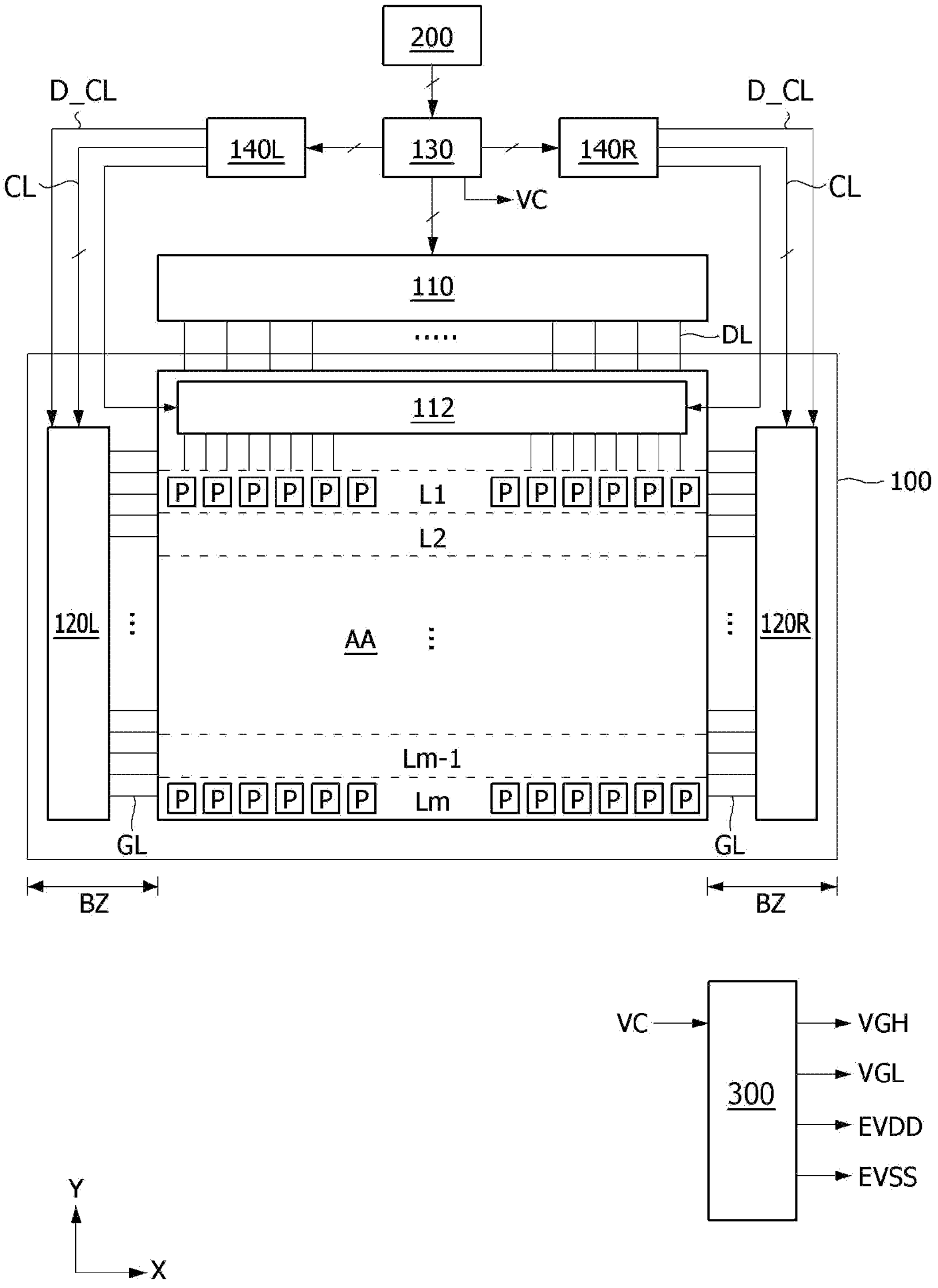
FIG. 12 is a block diagram illustrating a display device according to an embodiment of the present disclosure.

FIG. 12 is a block diagram illustrating a display device according to an embodiment of the present disclosure.

Referring to FIG. 12, a display device according to an embodiment of the present disclosure includes a display panel 100 and a display panel driving circuit.

A screen of the display panel 100 includes a pixel array AA that displays pixel data of an input image. The pixel data of the input image is displayed on pixels of the pixel array AA. The pixel array AA includes a plurality of data lines DL, a plurality of gate lines GL overlapping the data lines DL, and the pixels disposed in a matrix form. In addition to the matrix form, the pixels may be disposed in various forms, such as a form in which pixels emitting the same color are shared, a stripe form, a diamond form, and the like.

When the pixel array AA has a resolution of n*m, the pixel array AA includes n pixel columns and m pixel lines L1 to Lm that are transverse the pixel columns. The pixel line includes pixels disposed in a first direction X. The pixel column includes pixels disposed in the second direction. One horizontal period 1H is a time obtained by dividing one frame period by the number of m pixel lines L1 to Lm. Pixel data is written to pixels of one pixel line in one horizontal period 1H.

Each of the pixels includes two or more sub-pixels 101 for color implementation. For example, each of the pixels may be divided into a red sub-pixel, a green sub-pixel, and a blue sub-pixel. Each of the pixels may further include a white sub-pixel. Each of the sub-pixels 101 includes a pixel circuit. The pixel circuit includes a pixel electrode, one or more thin-film transistors (TFTs), and a capacitor. The pixel circuit is connected to the data line DL and the gate line GL.

Touch sensors may be disposed on the display panel 100 to implement a touch screen. A touch input may be sensed using separate touch sensors or through the pixels. The touch sensors may be implemented as on-cell type or add-on type touch sensors, which are arranged on the screen of the display panel, or may be implemented as in-cell type touch sensors, which are embedded in the pixel array.

The display panel driving circuit writes data of an input image to the pixels of the display panel 100 under control of a timing controller 130. The display panel driving circuit includes a data driver 110, gate drivers 120L and 120R (hereafter, collectively referred to as "120"), the timing controller 130 for controlling operation timings of the drivers 110 and 120, and level shifters 140L and 140R connected between the timing controller 130 and the gate driver 120. The level shifters 140L and 140R output clock signals and dummy clock signals to the gate drivers 120L and 120R through output clock lines CL and dummy clock lines D_CL. The display panel driving circuit further includes a power supply 300.

The data driver 110 converts pixel data of an input image received as a digital signal from the timing controller 130 into an analog gamma compensation voltage for each frame to output data signals Vdata1 to Vdata3. The data signals Vdata1 to Vdata3 output from the data driver 110 are supplied to the data lines DL. The data driver 110 outputs the data signals Vdata1 to Vdata3 using a digital-to-analog converter (hereinafter referred to as a "DAC") that converts a digital signal into an analog gamma compensation voltage. The data driver 110 may be composed of a plurality of source driver integrated circuits (ICs), and a touch sensor driver for driving the touch sensors may be embedded in each of the source driver ICs.

The display panel driving circuit may further include a demultiplexer array 112 disposed between the data driver 110 and the data lines DL.

The demultiplexer array 112 may time-divide a data signal output from one channel of the data driver 110 and distribute the time-divided data signal to the data lines DL by sequentially connecting the one channel of the data driver 110 to the plurality of data lines DL, thereby reducing the number of channels of the data driver 110.

The gate driver 120 may be formed in a bezel area BZ in which an image is not displayed on the display panel 100, or may be at least partially disposed in the pixel array AA. The gate driver 120 receives a clock transmitted from the level shifters 140L and 140R and outputs a gate pulse GATE. The gate pulse GATE is supplied to the gate lines GL.

The gate pulse GATE applied to the gate lines GL turns on switch elements of the sub-pixels 101 to select pixels to which voltages of the data signals Vdata1 to Vdata3 are charged. The switch element of the sub-pixel 101 is turned on in response to a gate-on voltage VGH of the gate pulse GATE, and is turned off according to a gate-off voltage VGL thereof. The gate pulse GATE swings between the gate-on voltage VGH and the gate-off voltage VGL. The gate driver 120 shifts the gate pulse using shift registers.

The gate driver 120 according to the embodiment may include a first gate driver 120L and a second gate driver 120R. Each of the first gate driver 120L and the second gate driver 120R may include the shift registers that sequentially output gate signals. Here, the gate signals include a scan signal, a sensing signal, an EM signal, and an initialization signal.

The timing controller 130 may multiply an input frame frequency by i (here "i" is a positive integer greater than 0) and control the operation timing of the drivers 110 and 120 in the display panel with a frame frequency of the input frame frequency x i Hz. The frame frequency is 60 Hz in the National Television Standards Committee (NTSC) scheme and 50 Hz in the Phase-Alternating Line (PAL) scheme.

The timing controller 130 receives pixel data of an input image and timing signals synchronized with the pixel data from a host system 200. The pixel data of the input image received by the timing controller 130 is a digital signal. The timing controller 130 transmits the pixel data to the data driver 110. The timing signals include a vertical synchronization signal Vsync, a horizontal synchronization signal Hsync, a clock signal DCLK, a data enable signal DE, and the like. The vertical synchronization signal Vsync and the horizontal synchronization signal Hsync may be omitted since a vertical period and a horizontal period may be obtained by a method of counting the data enable signal DE. The data enable signal DE has a period of one horizontal period 1H.

The timing controller 130 may generate a data timing control signal for controlling the data driver 110, a gate timing control signal for controlling the gate driver 120, a control signal for controlling the switch elements of the demultiplexer array 112, and the like based on the timing signals received from the host system 200. The gate timing control signal may be generated as a clock of a digital signal voltage level.

The host system 200 may be one among a television (TV), a set-top box, a navigation system, a personal computer (PC), a home theater device, a mobile system, and a wearable system. In the mobile system and the wearable system, the data driver 110, the timing controller 130, the level shifters 140L and 140R, and the like may be integrated in a single driver IC (not shown). In the mobile system, the host system 200 may be implemented as an application processor (AP). The host system 200 may transmit pixel data of an input image to the driver IC through a mobile industry processor interface (MIPI). The host system 200 may be connected to the driver IC through a flexible printed circuit, for example, a flexible printed circuit board (FPCB).

The clock output from the level shifters 140L and 140R swings between the gate-on voltage VGH and the gate-off voltage VGL and is supplied to the gate drivers 120L and 120R through the clock lines CL. The clock output from the level shifters 140L and 140R may be applied to at least one of the demultiplexer array 112, the gate driver 120, the data driver 110, and the touch sensor driver.

The power supply 300 generates voltages beneficial for driving the pixel array of the display panel 100 and the display panel driving circuit by using a DC-DC converter. The DC-DC converter may include a charge pump, a regulator, a buck converter, a boost converter, a buck-boost converter, and the like. The power supply 300 may adjust a DC input voltage output from the host system 200 to generate DC voltages such as a gamma reference voltage VGMA, the gate-on voltage VGH, the gate-off voltage VGL, common voltages of the pixels, and the like. The power supply 300 may generate constant voltages commonly applied to the pixels, for example, a pixel driving voltage EVDD and a pixel base voltage EVSS. The power supply 300 may change a voltage level of an output voltage according to a control signal VC generated from the timing controller 130.

Figure 13:
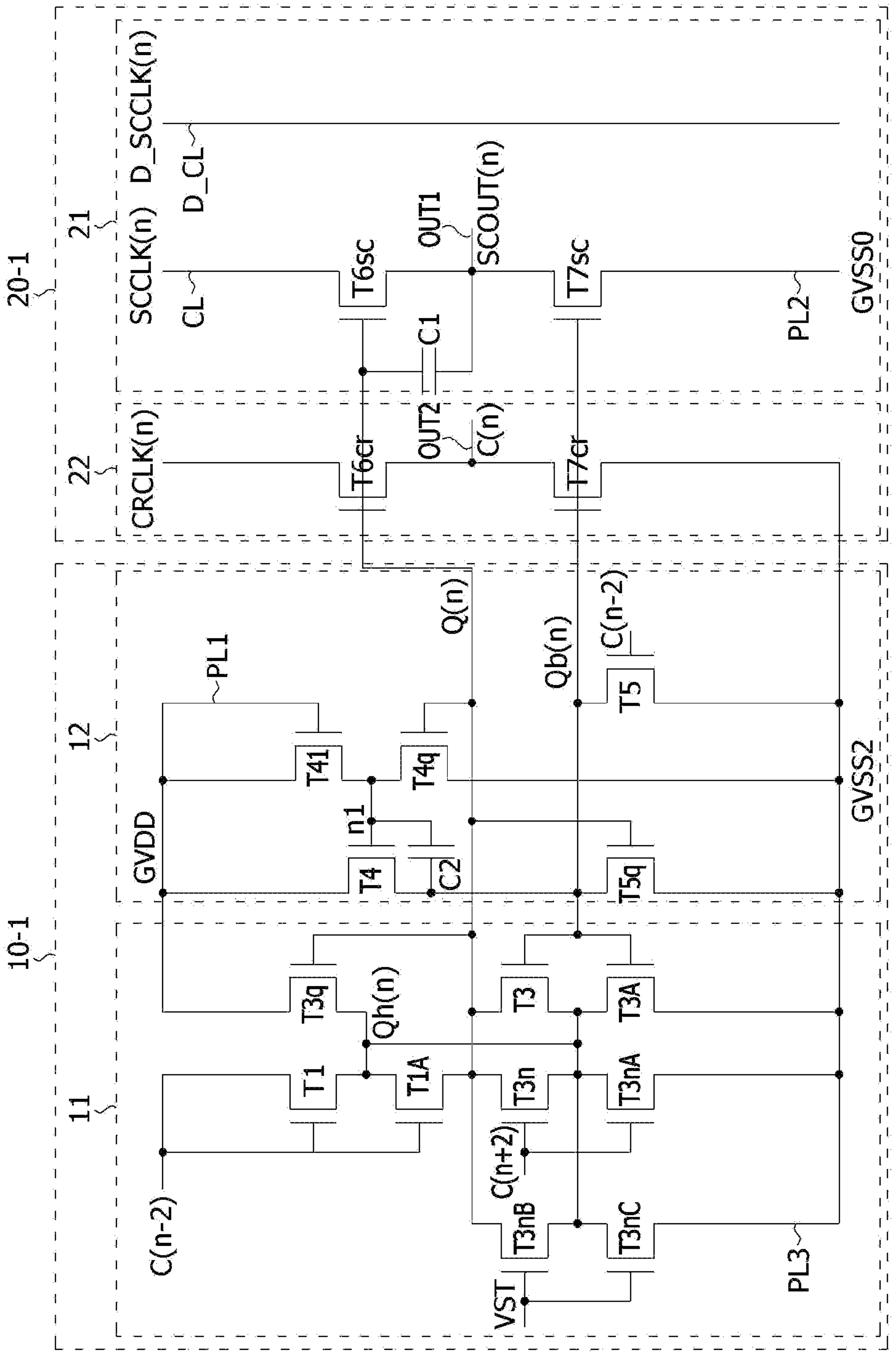
FIG. 13 is a diagram illustrating a gate driver according to a second embodiment of the present disclosure.

FIG. 13 is a diagram illustrating a gate driver according to a second embodiment of the present disclosure. Here, an example in which the gate driver is implemented as a scan driver will be described.

Referring to FIG. 13, a scan driver according to a second embodiment may include a first control node (hereinafter, referred to as a "Q node") for pulling up an output voltage, a second control node (hereinafter, referred to as a "Qb node") for pulling down the output voltage, a circuit unit 10-1, and a circuit unit 20-1.

The circuit unit 10-1 includes a first control circuit unit 11 and a second control circuit unit 12.

The first control circuit unit 11 serves to control charging and discharging of a Q node Q and a Qb node Qb. The first control circuit unit 11 includes a first transistor T1, a 1Ath transistor T1A, a third transistor T3, a 3Ath transistor T3A, a 3nth transistor T3*n*, a 3nAth transistor T3*n*A, a 3qth transistor T3*q*, a 3nBth transistor T3*n*B, and a 3nCth transistor T3*n*C.

The first transistor T1 is turned on by an (N−2)th carry signal C(n−2) applied from a previous signal transfer unit or circuit and transmits the (N−2)th carry signal C(n−2) to a Qh node Qh(n). The first transistor T1 includes a gate electrode and a first electrode, to which the (N−2)th carry signal C(n−2) is commonly applied, and a second electrode connected to the Qh node Qh(n).

The 1Ath transistor T1A is turned on by the (N−2)th carry signal C(n−2) applied from the previous signal transfer unit and charges the Q node Q(n) based on the (N−2)th carry signal C(n−2). The 1Ath transistor T1A includes a gate electrode to which an (N−2)th carry signal C(n−2) is applied, a first electrode connected to the second electrode of the first transistor T1, and a second electrode connected to the Q node Q(n).

The third transistor T3 is turned on by a voltage of the Qb node Qb(n) and discharges the Q node Q(n) to a second low-potential power voltage GVSS2 of a third power line PL3 together with the 3Ath transistor T3A. The third transistor T3 includes a gate electrode connected to the Qb node Qb(n), a first electrode connected to the Q node Q, and a second electrode connected to a first electrode of the 3Ath transistor T3A.

The 3Ath transistor T3A is turned on by the voltage of the Qb node Qb(n) and discharges the Q node Q(n) to the second low-potential power voltage GVSS2 of the third power line PL3 together with the third transistor T3. The 3Ath transistor T3A includes a gate electrode connected to the Qb node Qb(n), the first electrode connected to the second electrode of the third transistor T3, and a second electrode connected to the third power line PL3.

The 3nth transistor T3*n* is turned on by a (N+2)th carry signal C(n+2) applied from a next signal transfer unit or circuit and discharges the Q node Q(n) to the second low-potential power voltage GVSS2 of the third power line PL3 together with the 3nAth transistor T3*n*A. The 3nth transistor T3*n* includes a gate electrode to which the (N+2)th carry signal C(n+2) is applied, a first electrode connected to the Q node Q(n), and a second electrode connected to a first electrode of the 3nAth transistor T3*n*A.

The 3nAth transistor T3*n*A is turned on by the (N+2)th carry signal C(n+2) applied from the next signal transfer unit and discharges the Q node Q(n) to the second low-potential power voltage GVSS2 of the third power line PL3 together with the 3nth transistor T3*n*. The 3nAth transistor T3*n*A includes a gate electrode to which the (N+2)th carry signal C(n+2) is applied, the first electrode connected to the second electrode of the 3nth transistor T3*n*, and a second electrode connected to the third power line PL3.

The 3qth transistor T3*q* is turned on by a voltage of the Q node Q(n) and transmits a high-potential power voltage GVDD of a first power line PL1 to the Qh node Qh(n). The 3qth transistor T3*q* includes a gate electrode connected to the Q node Q(n), a first electrode connected to the first power line PL1, and a second electrode connected to the Qh node Qh(n).

The 3nBth transistor T3*n*B is turned on by a start pulse VST and discharges the Q node Q(n) to the second low-potential power voltage GVSS2 of the third power line PL3 together with the 3nCth transistor T3*n*C. The 3nBth transistor T3*n*B includes a first electrode connected to the Q node Q(n), a gate electrode to which the start pulse VST is applied, and a second electrode connected to a first electrode of the 3nCth transistor T3*n*C.

The 3nCth transistor T3*n*C is turned on by the start pulse VST and discharges the Q node Q(n) to the second low-potential power voltage GVSS2 of the third power line PL3 together with the 3nBth transistor T3*n*B. The 3nCth transistor T3*n*C includes the first electrode connected to the second electrode of the 3nBth transistor T3*n*B, a gate electrode to which the start pulse VST is applied, and a second electrode connected to the third power line PL3.

The second control circuit unit 12 includes a fourth transistor T4, a 41st transistor T41, a 4qth transistor T4*q*, a fifth transistor T5, and a 5qth transistor T5*q*.

The fourth transistor T4 is turned on by a voltage of a first node n1 and supplies the high-potential power voltage GVDD to the Qb node Qb(n). The fourth transistor T4 includes a first electrode connected to the first power line PL1 through which the high-potential power voltage GVDD is applied, a gate electrode connected to the first node n1, and a second electrode connected to the Qb node Qb(n).

A second capacitor C2 serves to form a bootstrapping voltage on the gate node of the fourth transistor T4.

The 41st transistor T41 is turned on by the high-potential power voltage GVDD and supplies the high-potential power voltage GVDD to the first node n1. The 41st transistor T41 includes a first electrode and a gate electrode, which are connected to the first power line PL1, and a second electrode connected to the first node n1.

The 4qth transistor T4*q* is turned on by the voltage of the Q node Q(n) and discharges the first node n1 to the second low-potential power voltage GVSS2. The 4qth transistor T4*q* includes a first electrode connected to the first node n1, a gate electrode connected to the Q node Q(n), and a second electrode connected to the third power line PL3.

The 5qth transistor T5*q* is turned on by the voltage of the Q node Q(n), and discharges the Qb node Qb(n) to the second low-potential power voltage GVSS2. The 5qth transistor T5*q* includes a first electrode connected to the Qb node Qb(n), a gate electrode connected to the Q node Q(n), and a second electrode connected to the third power line PL3.

The fifth transistor T5 is turned on by a voltage of the (N−2)th carry signal C(n−2) applied from the previous signal transfer unit, and discharges the Qb node Qb(n) to the second low-potential power voltage GVSS2. The fifth transistor T5 includes a first electrode connected to the Qb node Qb(n), a gate electrode to which the (N−2)th carry signal C(n−2) is applied from the previous signal transfer unit, and a second electrode connected to the third power line PL3.

The circuit unit 20-1 may include a first output circuit unit 21, and a second output circuit unit 22.

The first output circuit unit 21 may output a scan signal SCOUT(n) to a first output node OUT1 based on potentials of the Q node Q(n) and the Qb node Qb(n). The first output circuit unit 21 may include a first pull-up transistor T6*sc*, a first pull-down transistor T7*sc*.

The first pull-up transistor T6*sc* and the first pull-down transistor T7*sc* charge and discharge the first output node OUT1 according to the voltages of the Q node Q(n) and the Qb node Qb(n), and output the scan signal SCOUT(n). The first pull-up transistor T6*sc* includes a gate electrode connected to the Q node Q(n), a first electrode connected to an output clock line CL through which a scan clock signal SCCLK(n), which is an output clock signal, is applied, and a second electrode connected to the first output node OUT1. The first pull-down transistor T7*sc* is connected to the first pull-up transistor T6*sc* with the first output node OUT1 interposed therebetween. The first pull-down transistor T7*sc* includes a gate electrode connected to the Qb node Qb(n), a first electrode connected to the first output node OUT1, and a second electrode connected to a second power line PL2.

At this time, a dummy clock line D_CL disposed side by side with the output clock line CL and through which a dummy clock signal D_SCCLK(n) is applied in synchronization with the scan clock signal SCCLK(n) may be provided.

A first capacitor C1 serves to form a bootstrapping voltage on the gate node of the first pull-up transistor T6*sc*. Thais is, the first capacitor C1 raises the voltage of the gate node of the first pull-up transistor T6*sc*, that is, the voltage of the Q node Q(n), by a bootstrapping phenomenon.

The second output circuit unit 22 may output a carry signal C(n) to a second output node OUT2 based on the potentials of the Q node Q(n) and the Qb node Qb(n). The second output circuit unit 22 may include a second pull-up transistor T6*cr*, and a second pull-down transistor T7*cr*.

The second pull-up transistor T6*cr* and the second pull-down transistor T7*cr* charge and discharge the second output node OUT2 according to the voltages of the Q node Q(n) and the Qb node Qb(n) to output the carry signal C(n). The second pull-up transistor T6*cr* includes a gate electrode connected to the Q node Q(n), a first electrode to which a carry clock signal CRCLK(n) is applied, and a second electrode connected to the second output node OUT2. The second pull-down transistor T7*cr* is connected to the second pull-up transistor T6*cr* with the second output node OUT2 interposed therebetween. The second pull-down transistor T7*cr* includes a gate electrode connected to the Qb node Qb(n), a first electrode connected to the second output node OUT2, and a second electrode connected to the third power line PL3.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A gate driver comprising:

an output clock line through which an output clock signal is applied;

a dummy clock line disposed adjacent to the output clock line and through which a dummy clock signal is applied;

a pull-up transistor including a first electrode connected to the output clock line, a gate electrode connected to a first control node, and a second electrode connected to an output node from which a gate signal is output; and a pull-down transistor including a first electrode connected to the output node, a gate electrode connected to a second control node, and a second electrode connected to a power line through which a low-potential power voltage is applied, wherein the output clock line and the dummy clock line are disposed on different layers from each other, wherein the output clock line is disposed on a first layer, wherein the dummy clock line is disposed on a second layer located below the first layer; and wherein the pull-up transistor and the pull-down transistor are disposed on a third layer located below the second layer.

2. The gate driver of claim 1, wherein the output clock line and the dummy clock line are disposed to overlap each other.

3. The gate driver of claim 1, wherein the output clock signal and the dummy clock signal are input in synchronization with each other.

4. The gate driver of claim 1, wherein the output clock signal and the dummy clock signal are a same signal.

5. A display device comprising:

a data driver configured to output a data voltage;

a gate driver including a circuit unit configured to output a gate signal to an output node by transmitting an output clock signal and a low-potential power voltage to the output node according to voltages of a first control node and a second control node; and a plurality of pixel circuits configured to reproduce an input image by receiving the data voltage and the gate signal, wherein the gate driver includes:

an output clock line through which the output clock signal is applied;

a dummy clock line disposed adjacent to the output clock line and through which a dummy clock signal is applied;

a pull-up transistor including a first electrode connected to the output clock line, a gate electrode connected to the first control node, and a second electrode connected to the output node from which the gate signal is output; and a pull-down transistor including a first electrode connected to the output node, a gate electrode connected to the second control node, and a second electrode connected to a power line through which the low-potential power voltage is applied, wherein the output clock signal and the dummy clock signal are a same signal.

6. The display device of claim 5, wherein the output clock line and the dummy clock line are disposed on different layers from each other.

7. The display device of claim 6, wherein the output clock line and the dummy clock line are disposed to overlap each other.

8. The display device of claim 5, wherein the output clock line is disposed on a first layer, and the dummy clock line is disposed on a second layer located below the first layer.

9. The display device of claim 8, wherein the pull-up transistor and the pull-down transistor are disposed on a third layer located below the second layer.

10. The display device of claim 5, wherein the output clock signal and the dummy clock signal are input in synchronization with each other.

11. The display device of claim 5, wherein the gate driver includes a plurality of gate drivers configured to output different gate signals from each other, wherein each of the plurality of gate drivers includes a layer on which the output clock line is positioned and a layer on which the dummy clock line is positioned.

12. The display device of claim 5, wherein the gate driver includes a plurality of gate drivers configured to output different gate signals from each other, wherein each of the plurality of gate drivers includes a layer on which the output clock line is positioned and a layer on which the dummy clock line is positioned, wherein the layer on which the dummy clock line is positioned is integrated into a single layer.

13. A gate driver comprising:

an output clock line through which an output clock signal is applied;

a dummy clock line disposed adjacent to the output clock line and through which a dummy clock signal is applied;

a pull-up transistor including a first electrode connected to the output clock line, a gate electrode connected to a first control node, and a second electrode connected to an output node from which a gate signal is output; and a pull-down transistor including a first electrode connected to the output node, a gate electrode connected to a second control node, and a second electrode connected to a power line through which a low-potential power voltage is applied, wherein the output clock signal and the dummy clock signal are a same signal.

14. The gate driver of claim 13, wherein the output clock line and the dummy clock line are disposed on different layers from each other.

15. The gate driver of claim 14, wherein the output clock line and the dummy clock line are disposed to overlap each other.

16. The gate driver of claim 14, wherein the output clock line is disposed on a first layer, and the dummy clock line is disposed on a second layer located below the first layer.

17. The gate driver of claim 16, wherein the pull-up transistor and the pull-down transistor are disposed on a third layer located below the second layer.

18. The gate driver of claim 13, wherein the output clock signal and the dummy clock signal are input in synchronization with each other.

* * * * *